United States Patent [19]

Strand

[11] Patent Number: 5,286,011
[45] Date of Patent: Feb. 15, 1994

[54] BUSH TYPE HYDRAULICALLY DAMPED MOUNTING DEVICE

[75] Inventor: Miles E. Strand, St. Marys, Ohio

[73] Assignee: The Goodyear Tire & Rubber Company, Akron, Ohio

[21] Appl. No.: 985,715

[22] Filed: Dec. 4, 1992

[51] Int. Cl.⁵ ............................................. F16F 5/00
[52] U.S. Cl. ................................ 267/140.12; 267/219
[58] Field of Search ................ 267/140.12, 219, 153; 248/562, 636

[56] References Cited

U.S. PATENT DOCUMENTS

| | | | |
|---|---|---|---|
| 4,771,990 | 9/1988 | Domer et al. | 267/219 X |
| 4,869,475 | 9/1989 | Bouhier | 267/140.12 |
| 4,895,353 | 1/1990 | Roth et al. | 267/140.12 |
| 4,936,555 | 6/1990 | Ishiyama et al. | 267/140.12 |
| 5,029,825 | 7/1991 | Doi | 267/219 X |
| 5,044,813 | 9/1991 | Gregg | 267/140.12 X |
| 5,054,752 | 10/1991 | Tabata | 267/219 X |
| 5,199,691 | 4/1993 | Bouhier et al. | 267/140.12 |

*Primary Examiner*—Robert J. Oberleitner
*Assistant Examiner*—Kevin D. Rutherford
*Attorney, Agent, or Firm*—Marc R. Dion, Sr.

[57] ABSTRACT

A bush type mounting device having outer and intermediate sleeves, an inner metal portion and a rubber spring between the inner metal and the intermediate sleeve. The device has an inertial damping channel in an annular space between the outer sleeve and the intermediate sleeve. Damping decoupling is provided by a decoupling plate which extends radially outward from the intermediate sleeve in close association with a holding device.

8 Claims, 6 Drawing Sheets

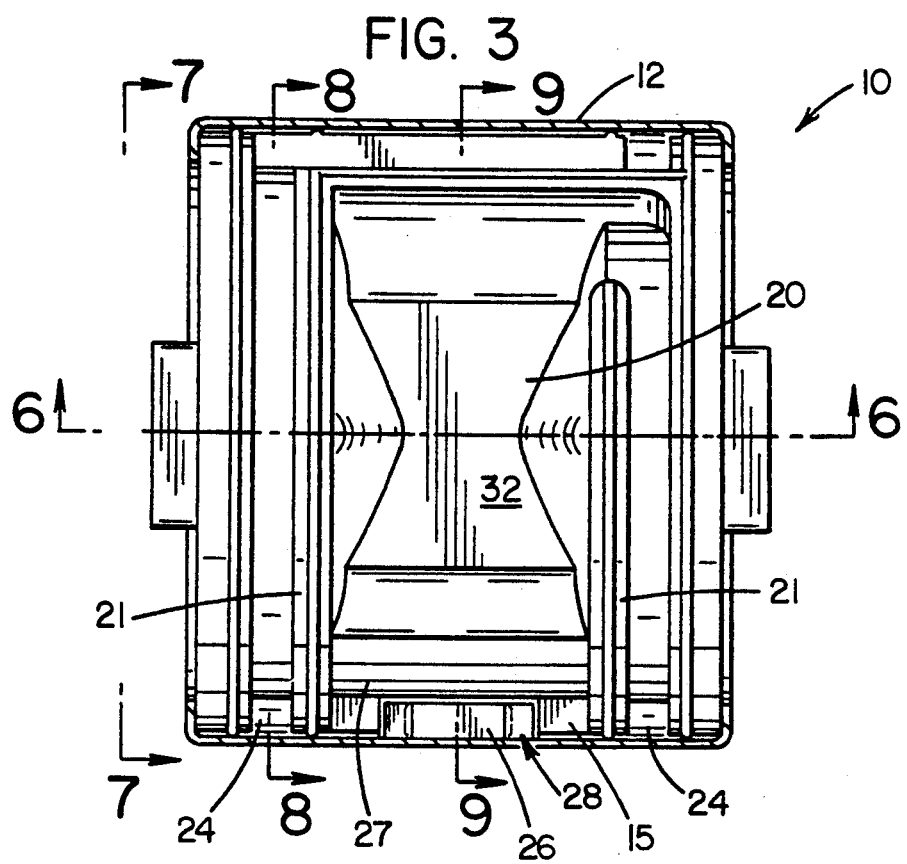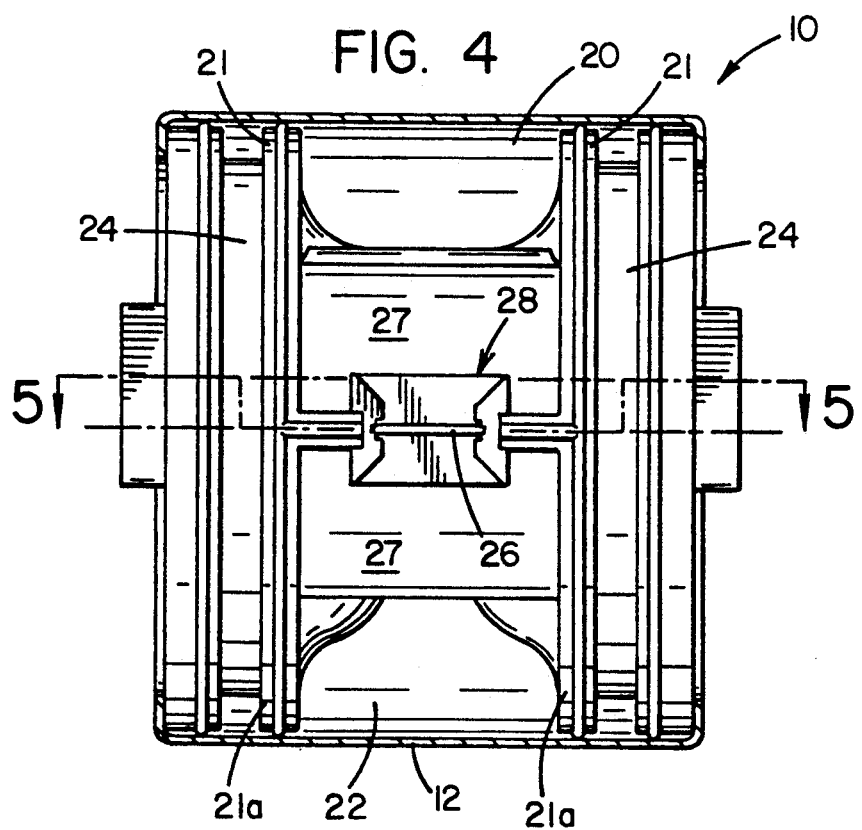

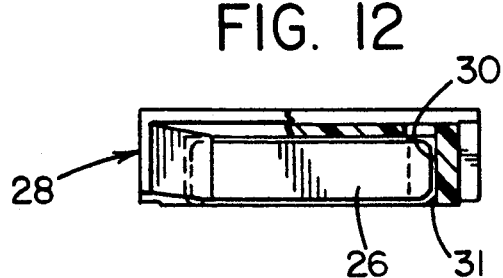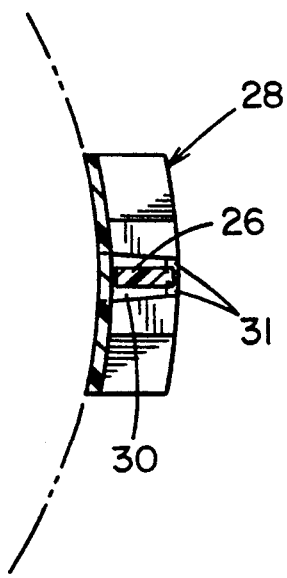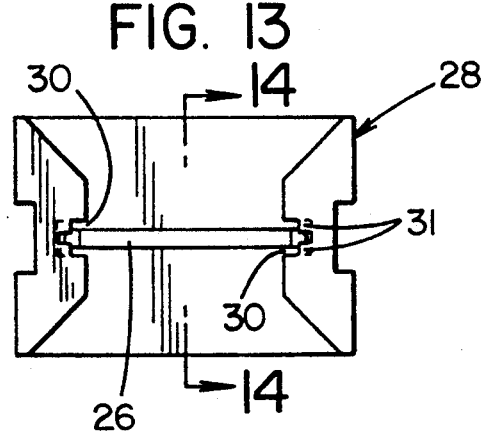

BUSH TYPE HYDRAULICALLY DAMPED MOUNTING DEVICE

FIELD OF THE INVENTION

This invention relates to bush type mounting devices. More particularly, this invention relates to hydraulically damped bush type mounting devices. Most particularly, this invention describes a hydraulically damped bushing which utilizes inertial damping and internal damping decoupling for small amplitudes.

BACKGROUND OF THE INVENTION

Bush type hydraulically damped mounting devices are known in which the anchor part for one part of the vibrating machinery is in the form of a hollow sleeve with the other anchor part in the form of a rod or tube extending approximately centrally and coaxially of the sleeve. Resilient walls then join the sleeve and the tube and define two chambers connected by a passage way. The chambers are filled with hydraulic fluid, and the movement of the fluid from one chamber to the other through the passageway damps the vibration of the parts of the machinery attached to the respective anchor points. See for example, U.S. Pat. No. 4,771,990 and U.S. Pat. No. 5,044,813 and Japanese Patent Application No. 61-206838(A).

In addition to inertial damping of vibrations having a high amplitude, e.g. greater than 0.5 mm, and low frequency, e.g. about 4-15 Hz., it is desirable to provide for damping decoupling for vibrations having a low amplitude, e.g. less than 0.5 mm, and high frequency, e.g. about 8-30 Hz.

In accordance with the practice of the present invention, there is provided a bush type mounting device comprising;
(a) an outer sleeve;
(b) an intermediate sleeve, radially inward from said outer sleeve defining an annular space there between;
(c) an inner metal portion radially inward from said intermediate sleeve;
(d) a rubber spring bonded to an outer surface of said inner metal and to an inner surface of said intermediate sleeve diametrically located to provide said device with an upper chamber and a lower chamber, each containing a fluid;
(e) an inertial damping channel molded in said annular space connecting said upper and lower chambers; and
(f) means for hydraulically decoupling said fluid between said upper and lower chambers in said annular space, wherein said decoupling means comprises a plate extending radially outwardly between the intermediate sleeve and the outer sleeve in free association with a holding means.

BRIEF DESCRIPTION OF THE DRAWINGS

FIG. 3 is a top plan view of the mounting device, partly is section.

FIG. 4 is a side view, partly in section, illustrating the decoupler assembly of the present invention.

FIG. 12 is a top view partly in section of the decoupler assembly of the present invention.

FIG. 13 is a radial side view of the decoupler assembly.

FIG. 14 is an axial cross-sectional view of the decoupler assembly taken along line 14—14 of FIG. 13.

DETAILED DESCRIPTION OF THE INVENTION

Figure 1:
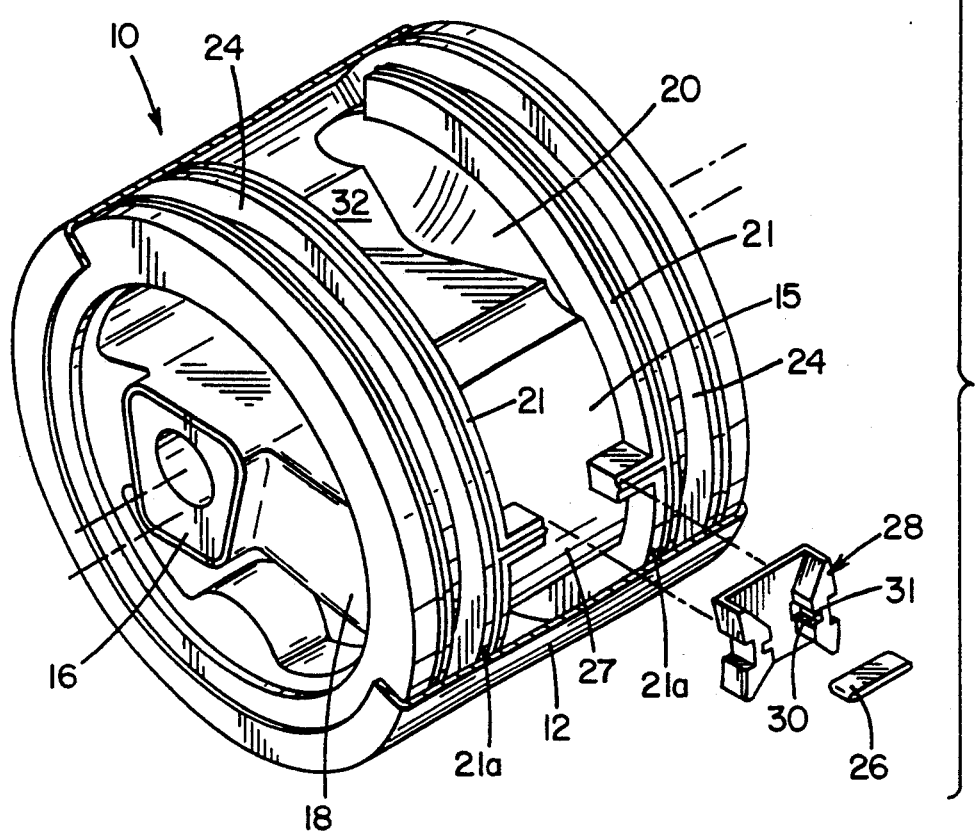
FIG. 1 is a perspective view, partly in section, of the top of the bush type mounting device with the decoupler assembly exploded away.
Figure 2:
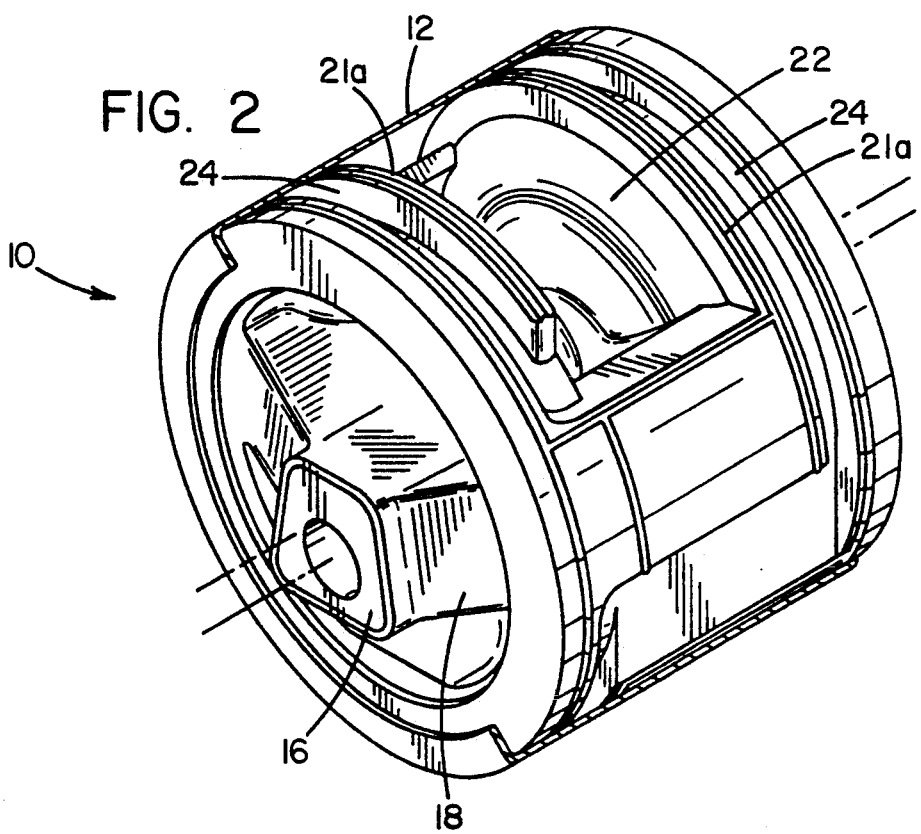
FIG. 2 is a view similar to FIG. 1 of the bottom of the mounting device.
Figure 5:
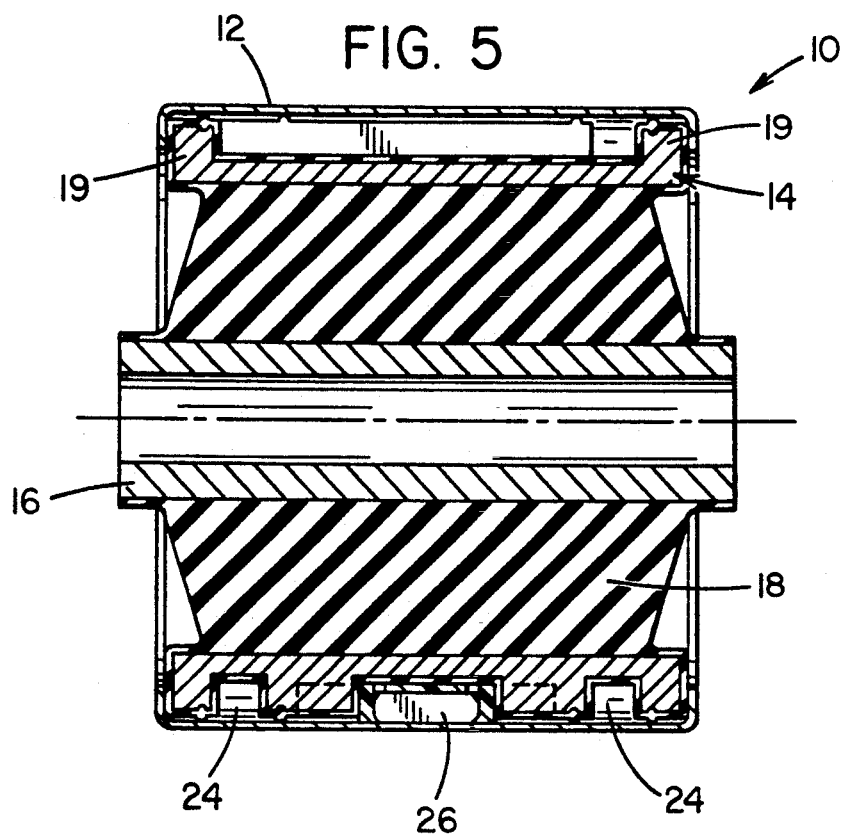
FIG. 5 is a cross-sectional view taken along line 5—5 of FIG. 4 from side to side.
Figure 6:
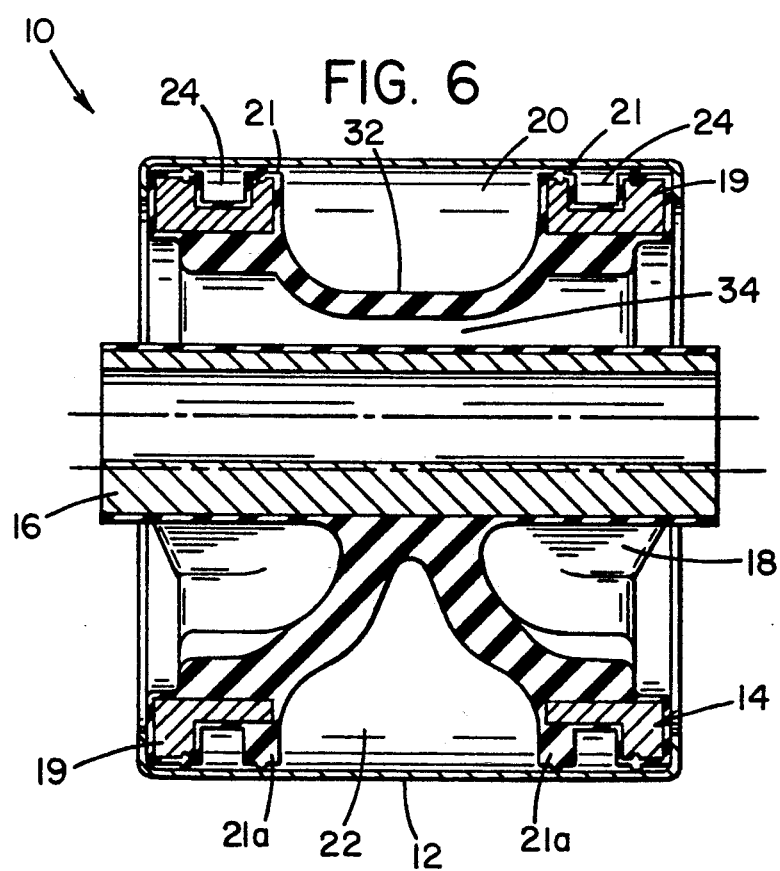
FIG. 6 is a cross-sectional view taken along line 6—6 of FIG. 3 from top to bottom.
Figure 7:
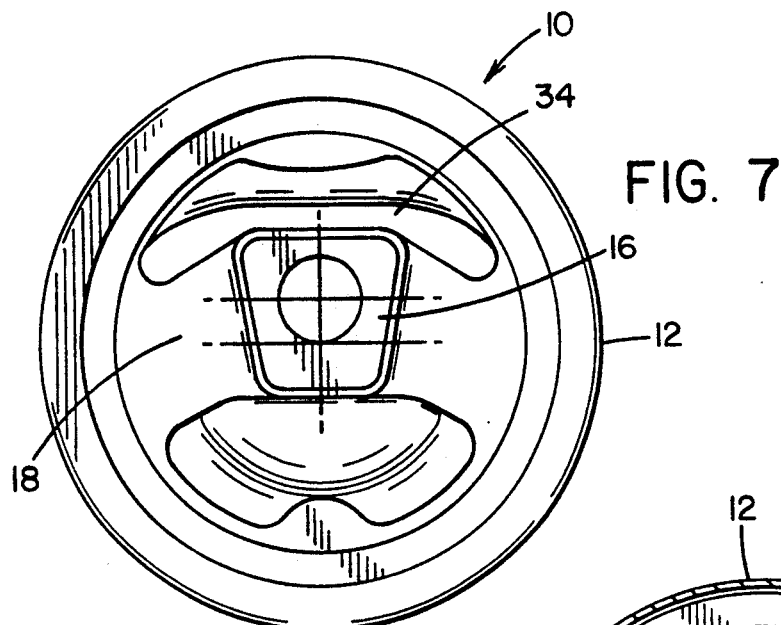
FIG. 7 is an end view taken along line 7—7 of FIG. 3.
Figure 8:
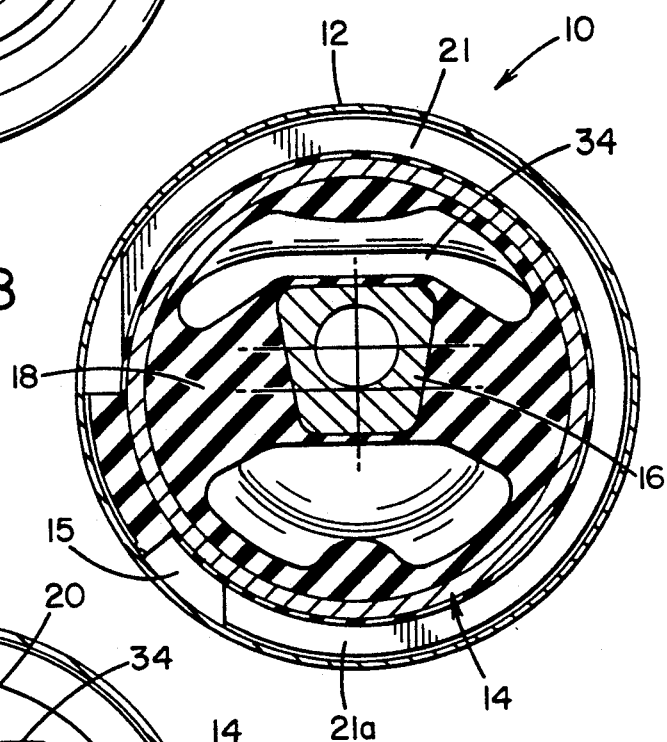
FIG. 8 is a cross-sectional view taken along line 8—8 of FIG. 3 illustrating the damping channel of the mounting device.
Figure 9:
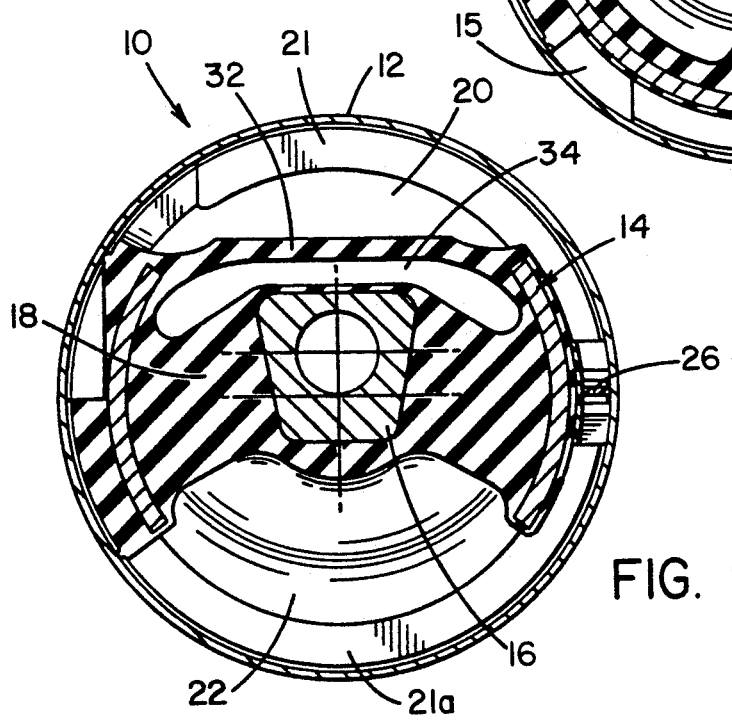
FIG. 9 is a cross-sectional view taken along line 9—9 of FIG. 3.
Figure 10:
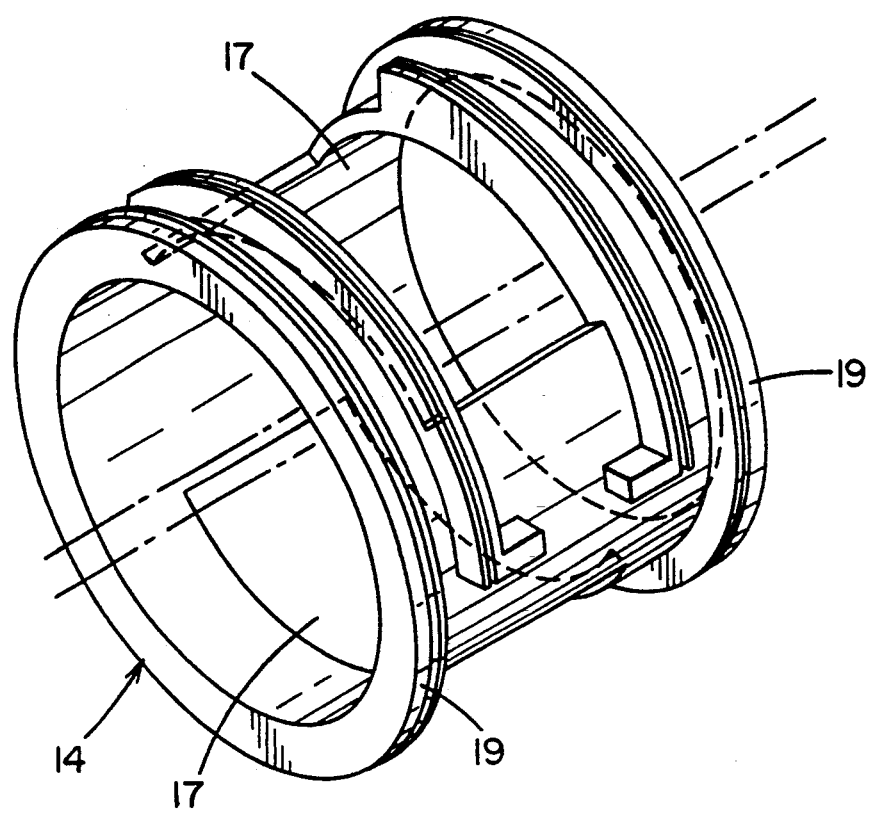
FIG. 10 is a perspective view of the intermediate sleeve of the present invention.

The drawings illustrate a bush type mounting device shown generally at 10 having an outer sleeve 12, an intermediate sleeve 14 having windows 17 and radially outward flanges 19 located radially inward from the outer sleeve 12 to define an annular space 15. Radially inward from the intermediate sleeve 14 is the inner metal portion 16 which can have an aperture therethrough, as illustrated, or mounting bolts may be attached. A rubber spring 18 is bonded between an outer surface of the inner metal 16 and an inner surface of the intermediate sleeve 14 and is diametrically located to provide an upper chamber 20 and a lower chamber 22. The upper chamber 20 is formed to have a diaphragm portion 32 which is not bonded to the inner metal 16 to leave opening 34 to allow for diaphragm expansion.

Figure 11:
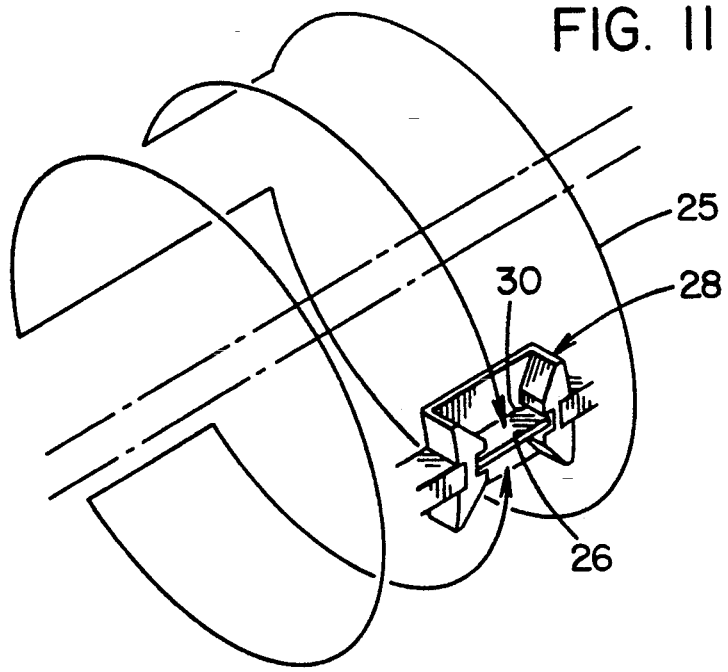
FIG. 11 is a diagrammatic representation illustrating the flow of the hydraulic fluid within the damping channel, the upper and lower chambers and the decoupling channel.

The device is completely filled with hydraulic fluid and inertial damping is provided by the narrow channel 24 which is comprised of two circumferential grooves axially outward of the chambers, each with an opening to one of the chambers and a crossover axial groove diametrically opposite the decoupling plate. The flow pattern 25 in the damping channel 24 is illustrated in FIG. 11. The outer boundaries of the inertial damping channel are formed by the radially outwardly extending flanges 19 of the intermediate sleeve 14. The inner boundaries 21 of the inertial damping channel 24 are formed of molded rubber as shown at 21a or rubber coated metal or plastic depending on what material is chosen for the intermediate sleeve.

Decoupling is provided in the decoupling channel 27 by the decoupling plate 26 which extends radially outward from a holding means 28 in the form of a saddle type structure having axially opposed slots 30,30 whose widths are larger than the thickness of the plate. It is preferred that the outward portion of the decoupling plate 26 closely abuts the outer sleeve 12 without touching it in order to minimize or seal off the amount of fluid passing between the two. It is preferred that the holding means 28 has tabs 31 at the radially outmost extremities of the slots 30 to retain the decoupling plate 26 in the holding means 28 during assembly. The holding means 28 is held in place by the inner surface of the axially inner boundaries 21.

During operation of the mounting device, in situations where the vibrations are of a relatively low amplitude, the decoupling plate 26 will vibrate within the saddle slot 30 which prevents the hydraulic fluid from passing through the inertial damping channel. Under conditions of relatively high amplitude, the decoupler plate 26 will be forced against the saddle slot 30 and the hydraulic fluid will pass through the inertial damping channel in order to dampen the vibration.

The sleeves and the inner metal are generally made of metal. However, it is contemplated that they could be made of engineering thermoplastic. The decoupling plate and the holding means can be made of either metal or thermoplastic. It is preferred that the decoupler plate and the holding means be made of a thermoplastic, for example, nylon.

While certain representative embodiments and details have been shown for the purpose of illustrating the invention, it will be apparent to those skilled in this art that various changes and modifications may be made therein without departing from the spirit or scope of the invention.

What is claimed is:

1. A bush type mounting device comprising:
   (a) an outer sleeve;
   (b) an intermediate sleeve, radially inward from said outer sleeve defining an annular space therebetween;
   (c) an inner metal portion radially inward from said intermediate sleeve;
   (d) a rubber spring bonded to an outer surface of said inner metal and to an inner surface of said intermediate sleeve diametrically located to provide said device with an upper chamber and a lower chamber, each containing a fluid;
   (e) an inertial damping channel molded in said annular space connecting said upper and lower chambers; and
   (f) means for hydraulically decoupling said fluid between said upper and lower chambers in said annular space, wherein said decoupler means comprises a plate extending radially outwardly between the intermediate sleeve and the outer sleeve in free association with a holding means; and
   (g) wherein said holding means is a saddle type structure having axially opposed slots whose widths are larger than the thickness of the plate.

2. The device according to claim 1 wherein said damping channel is comprised of two circumferential grooves axially outward of said chambers, each with an opening to one of said chambers and a crossover axial groove.

3. The device according to claim 2 wherein said intermediate sleeve is comprised of a generally cylindrical metal having window openings for the upper and lower chambers and radially outwardly extending flanges which form the axially outward boundaries of said inertial damping channel.

4. The device according to claim 3 wherein axially inner boundaries of the inertial damping channel are formed of molded rubber.

5. The device according to claim 4 wherein the holding means is held in place by the axially inner boundaries.

6. The device according to claim 3 wherein axially inner boundaries of the inertial damping channel are formed of rubber covered metal or thermoplastic.

7. The device according to claim 1 wherein the slots further comprise tabs at their radially outmost extremities to retain said plate in said holding means during assembly of said device.

8. The device according to claim 1 wherein said upper chamber is comprised of a rubber diaphragm radially outwardly spaced from said inner metal to allow for expansion and contraction of said upper chamber.

* * * * *